United States Patent [19]

Delano

[11] Patent Number: 4,478,304
[45] Date of Patent: Oct. 23, 1984

[54] COMPRESSED AIR POWER ENGINE

[76] Inventor: Tony M. Delano, Rte. 4, Box 363, Amarillo, Tex. 79115

[21] Appl. No.: 261,122
[22] PCT Filed: Aug. 14, 1980
[86] PCT No.: PCT/US80/01049
  § 371 Date: Aug. 14, 1980
  § 102(e) Date: Aug. 14, 1980
[87] PCT Pub. No.: WO82/00615
  PCT Pub. Date: Mar. 4, 1982
[51] Int. Cl.³ .............................................. B60K 9/00
[52] U.S. Cl. ...................................... 180/165; 60/414; 60/416; 180/302; 180/309
[58] Field of Search ...................... 180/54 B, 165, 302, 180/309; 60/407, 413, 414, 416

[56] References Cited

U.S. PATENT DOCUMENTS 3,765,180 10/1973 Brown ............................ 180/302 X
3,847,058 11/1974 Manor ............................. 180/302 X
4,018,050 4/1977 Murphy ............................ 60/407 X

FOREIGN PATENT DOCUMENTS 2359721 6/1975 Fed. Rep. of Germany ...... 180/302

Primary Examiner—Robert J. Spar
Assistant Examiner—Donald W. Underwood
Attorney, Agent, or Firm—Edward H. Gerstenfield

[57] ABSTRACT

In a wheeled vehicle engine system comprising a compressed air powered engine and tank assemblies, an engine connects to the vehicle drive wheels and is powered by compressed air and operates without emitting air pollutants and the tank assembly comprises a replaceable and/or rechargeable main air tank assembly containing air at high pressure and recovery tanks both so connected to the engine and arranged so as to recover and store energy of the vehicle and engine developed during braking and high speed engine operation and not fully used to propel the vehicle. Pressure sensors and alternative valving arrangements of the tank assemblies actuate compressors driven by the motor to maximize utilization of the energy content of the tank assemblies.

12 Claims, 15 Drawing Figures

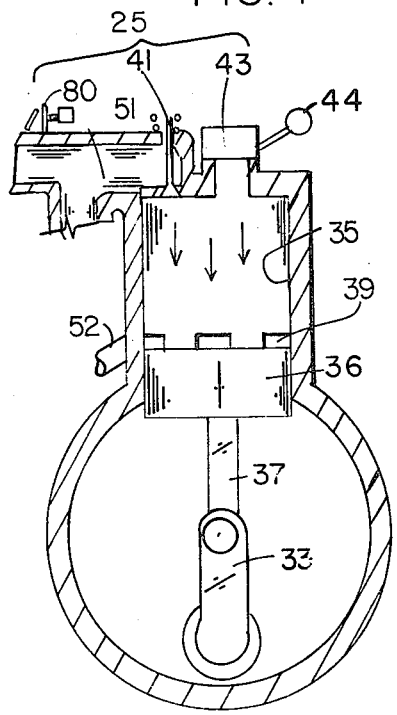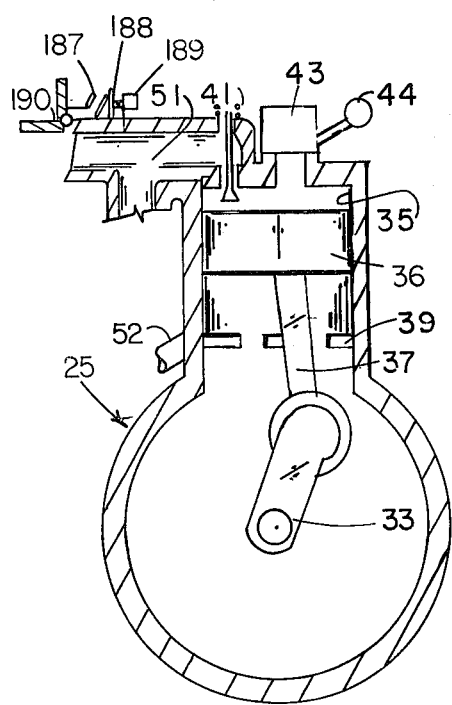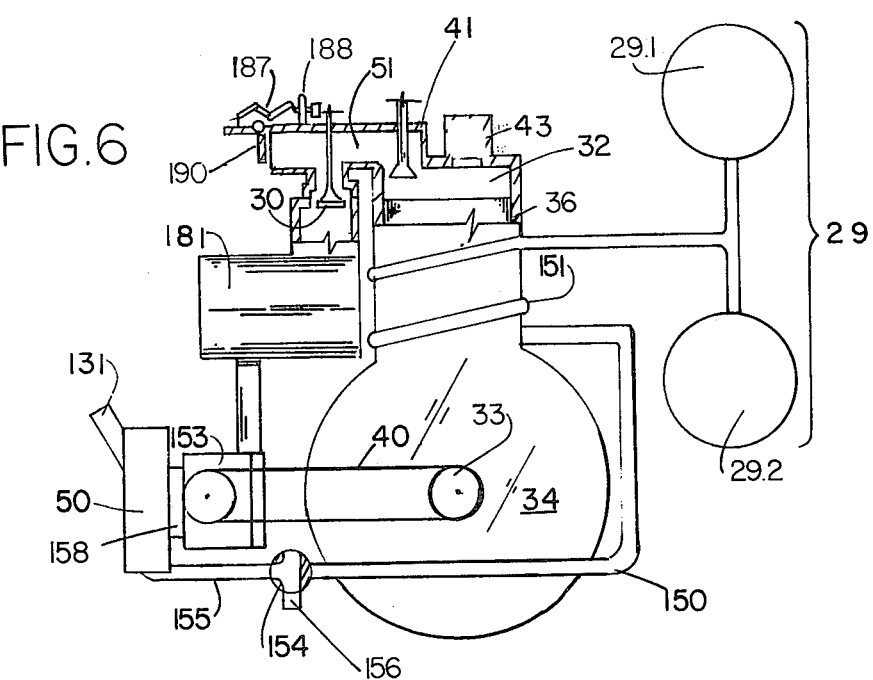

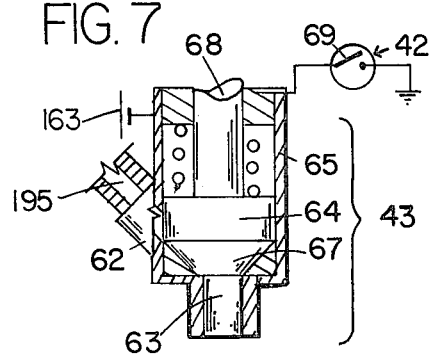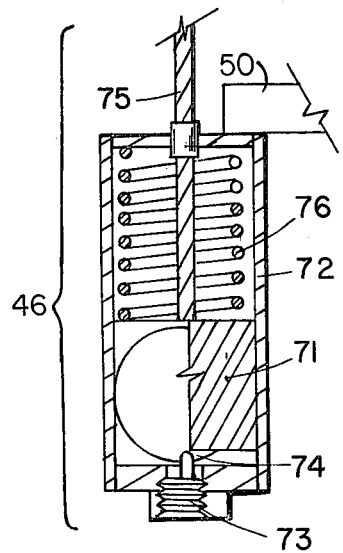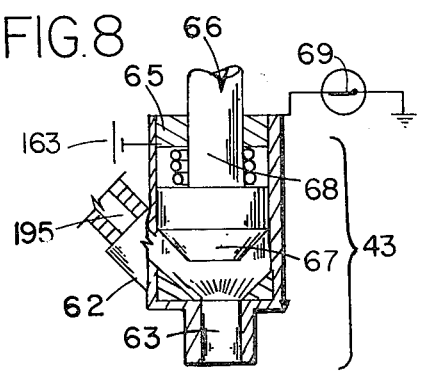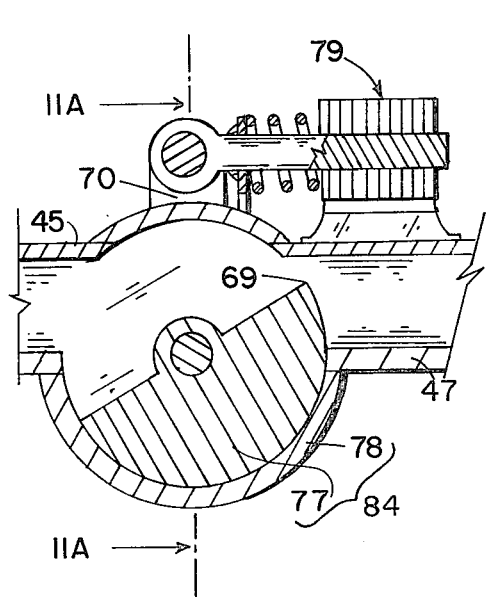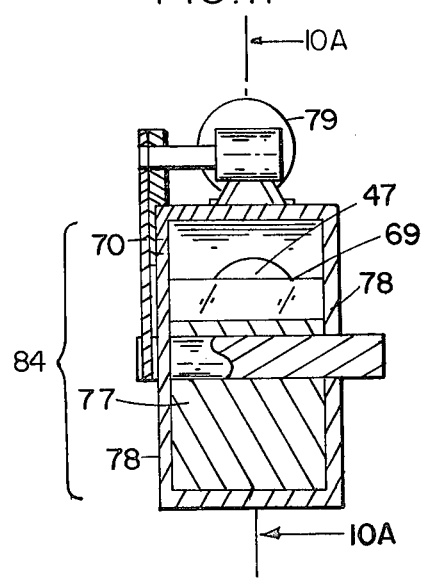

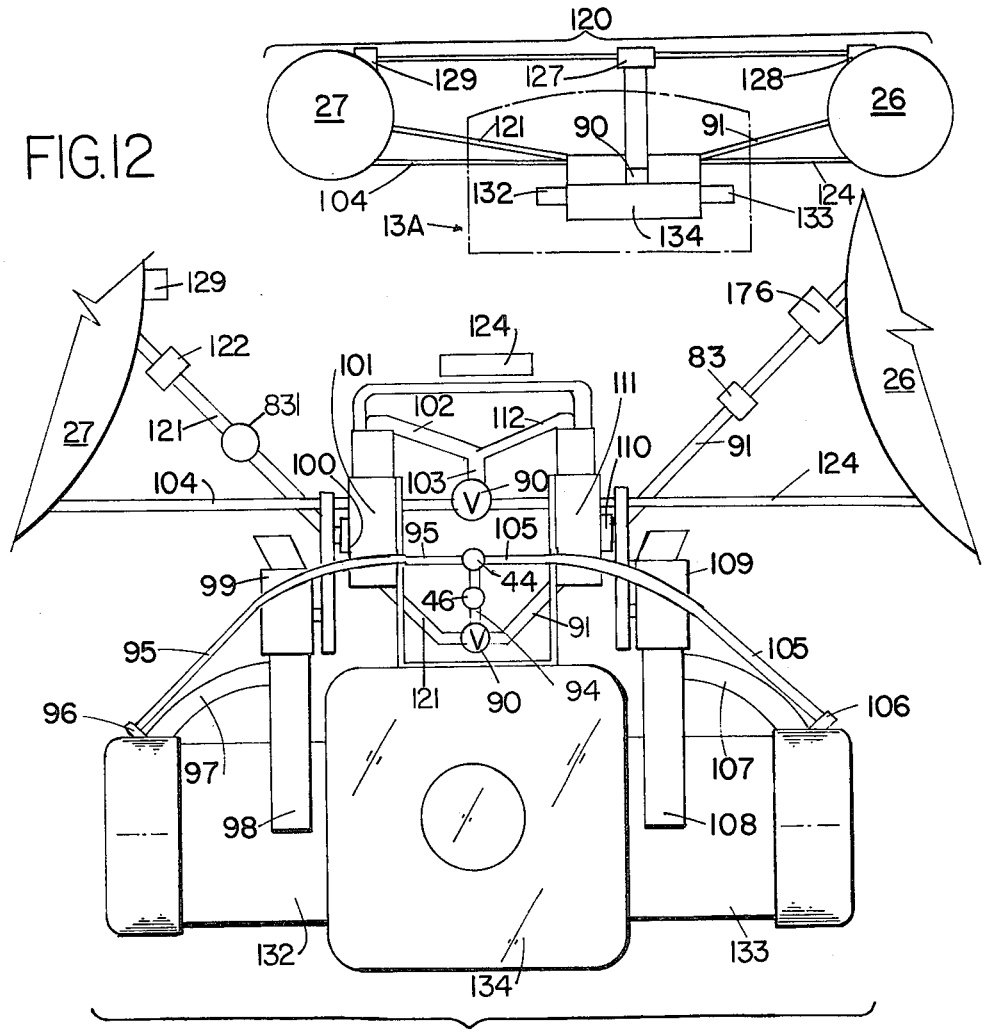
FIG.12
FIG.13
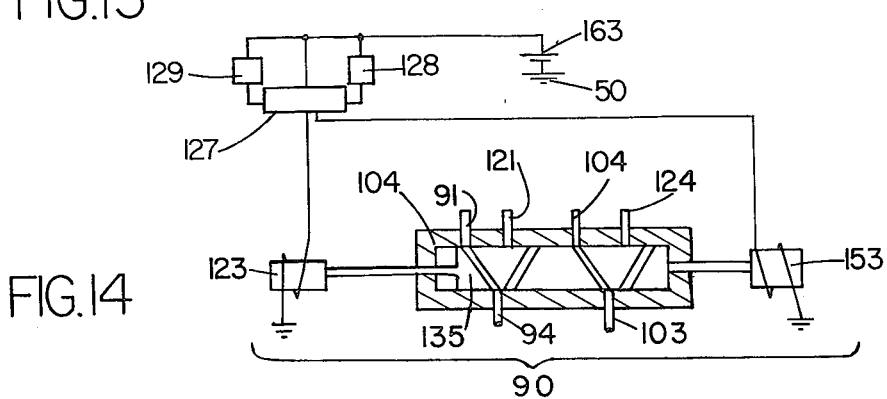
FIG.14

COMPRESSED AIR POWER ENGINE

TECHNICAL FIELD

The field to which this invention relates is vehicular transportation.

BACKGROUND ART

Conventional vehicular transportation even in crowded urban environments has required toleration of sulfur and carbon-containing chemical environmental pollutants produced by internal combustion engines and ozone emission and high battery cost of electrically operated vehicles. By the apparatuses and process of this invention, chemical pollution is ratuses and process of this invention, chemical pollution is eliminated. Further, the systems herein described utilize what might otherwise be lost energy on braking a moving vehicle and also utilize usual lost exhaust pressure energy.

The prior art has not taught or provided pollution-free transportation vehicles that provide conventional passenger seating and comfort at costs competitive with conventional internal combustion engine-powered vehicles nor air engines that cycle exhaust and vehicular energy.

Representative prior art is as follows: U.S. Pat. No. 193,631 Pneumatic Engine, July 31, 1871 to J. F. Allen; U.S. Pat. No. 3,396,631 Fluid Driven Engine With Improved Fluid Amplifier Valve Means, August 13, 1968, to K. E. Woodward; Marco Matteucci, History of the Motor Car, Crown Publishers, New York, 1970, pages, 14-17; Terry R. Miller, Air Powered Cars, Tri-State Printing Co., Galena, Kansas, 1979, pages 1-5.

DISCLOSURE OF INVENTION

The apparatus and processes disclosed utilize compressed air storage and control systems to actuate vehicles and so provide vehicular transport as shown in FIG. 1 for people while avoiding production or distribution of exhaust gases that are harmful to humans.

As shown in the arrangement of tank assemblies in FIGS. 3 and 15, the exhaust energy of the engine 25 and braking energy of the vehicle are recovered for further use in propelling the vehicle 20; and as shown in the engine system of FIGS. 6 and 12-14 not only are the recovered gases used to propel the vehicle but also the energy of the exhaust gases recovered from such operation are stored for further use to propel the vehicle.

BRIEF DESCRIPTION OF DRAWINGS

FIGS. 4 and 5 show steps in a sequence of operation of the piston, crankshaft, and other major portions of the engine 25 during a cycle of operation of that engine.

FIG. 6 shows a variation in structure of the apparatus of FIGS. 3, 4 and 5.

FIGS. 7 and 8 show the air injector valve in two different positions during its operation.

FIG. 9 is in part a sectional view of air volume control slide valve 46 along plane 9A—9A of FIG. 3, and in part a view with part of the slide removed.

FIGS. 10 and 11 show a tank valve; FIG. 10 is a vertical sectional view along the vertical plane shown by line 10A—10A of FIG. 11 and FIG. 11 is a vertical longitudinal section along the plane 11A—11A of FIG. 10.

FIG. 12 is a diagrammatic view of tank assemblies and engine in one system according to this invention.

FIG. 13 is an enlarged view of zone 13A of FIG. 12.

FIG. 14 is an enlarged diagrammatic view of the changeover valve 90 to which connections are shown in FIG. 13.

BEST MODES FOR CARRYING OUT THE INVENTION

Figure 1:
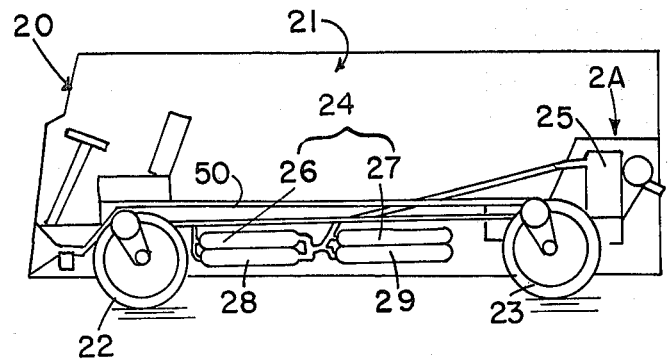
FIG. 1 is a diagrammatic overall view of a vehicle 20 using an engine 25 according to this invention.
Figure 2:
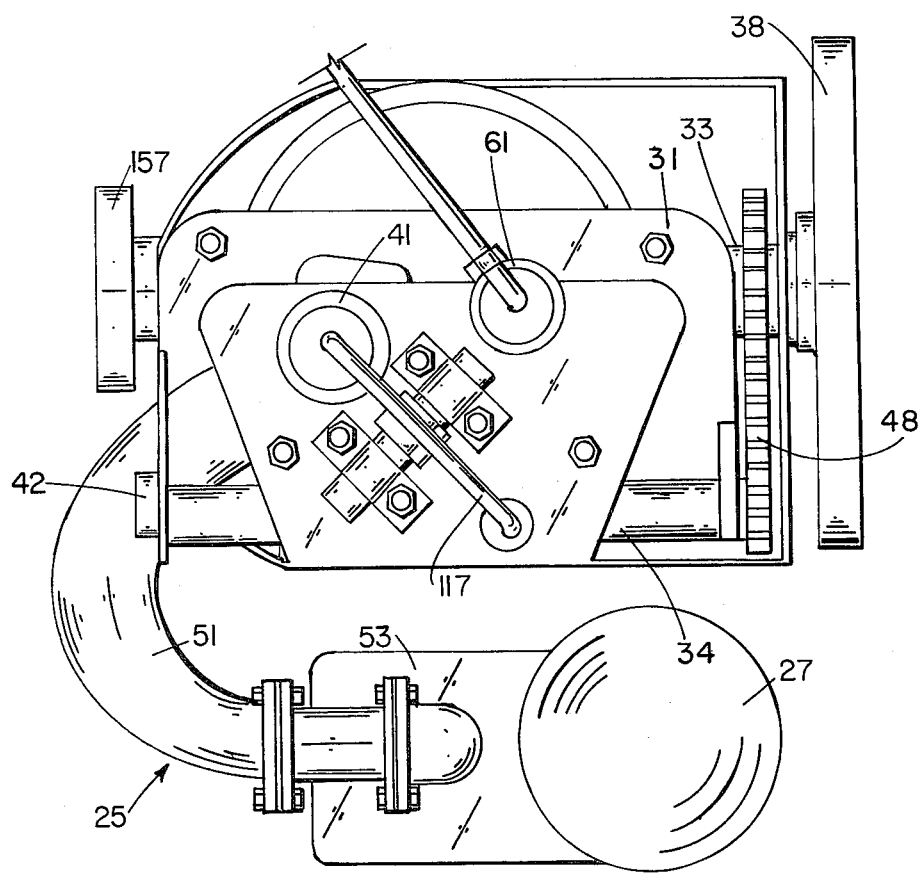
FIG. 2 is a top view of the engine 25 of vehicle 20 as seen in the direction of the arrow 2A of FIG. 1.
Figure 3:
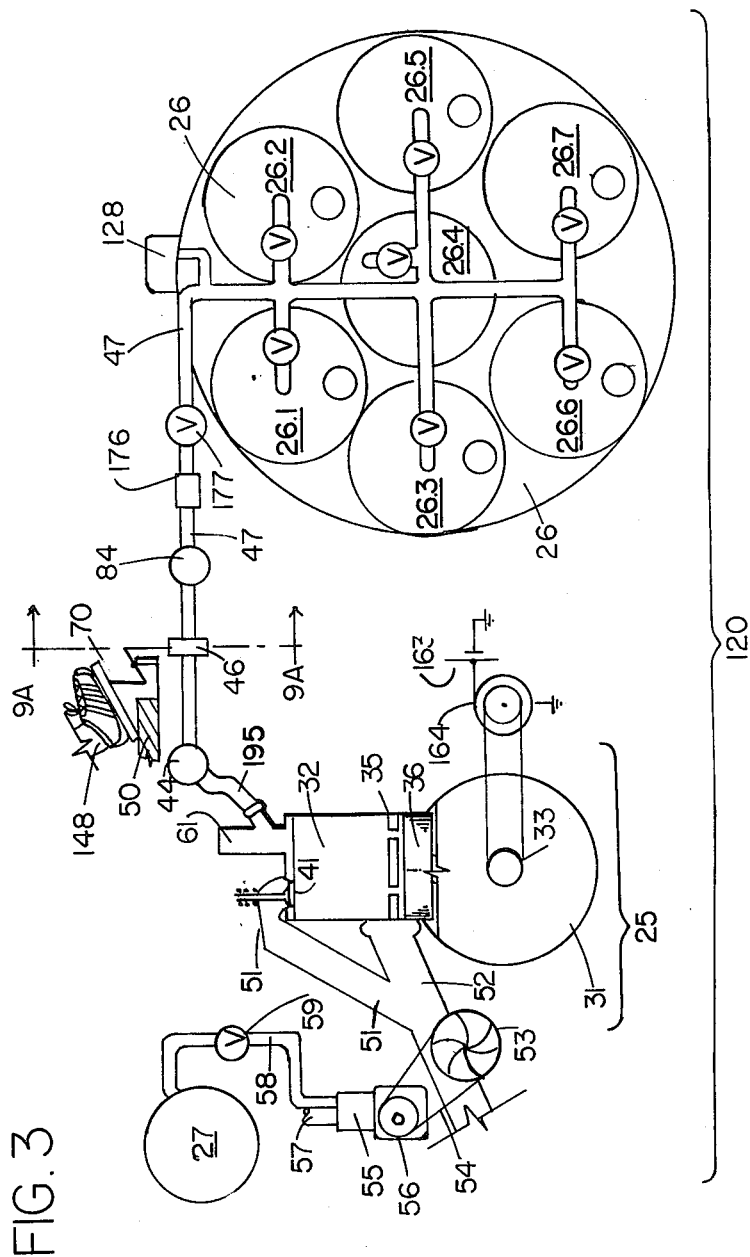
FIG. 3 is a diagrammatic expanded view of portions of the system 120 to show functional relationship of the parts thereof during operation of that system.

A vehicle 20 shown in FIG. 1 comprises a rigid frame 50 firmly attached to and supporting a passenger compartment 21, wheels as 22 and 23, a valve and tank assembly 24 and engine 25. Valve and tank assembly 24 comprises a plurality of like high pressure main tank and recovery tank assemblies 26, 27, 29 and 49. Valve and tank assembly 24 and engine 25 form an engine system 120, as shown in FIG. 3. While FIG. 1 shows the tank assembly 24 in a truck compartment below the floor of the passenger compartment, as in a bus or truck, the tank assembly 24 may also be located in the trunk of a car, whereby the standard sedan type automobile may have its internal engine substituted for by the engine as system 120 herebelow and the trunk space used for holding compartmentalized tanks or a rack for separate cylindrical tanks connected as below described. rate cylindrical tanks connected as below described.

Generally, the engine 25 comprises a rigid casing 31 which rotatably supports a crankshaft 33 and a camshaft 34 in engine casing bearings therefor. The casing 31 has formed therein a plurality of like cylindrical chambers or cylinders as 32. In each of the cylinder chambers there is located a piston 36 which forms a smooth slidable fit with the walls 35 of each such cylinder. Each piston is rotatably attached to the crankshaft by a rigid linkage 37. The camshaft 34 actuates a valve timing mechanism 42, which connects to air injectors as 43, and valves as 30 and 41.

Figure 15:
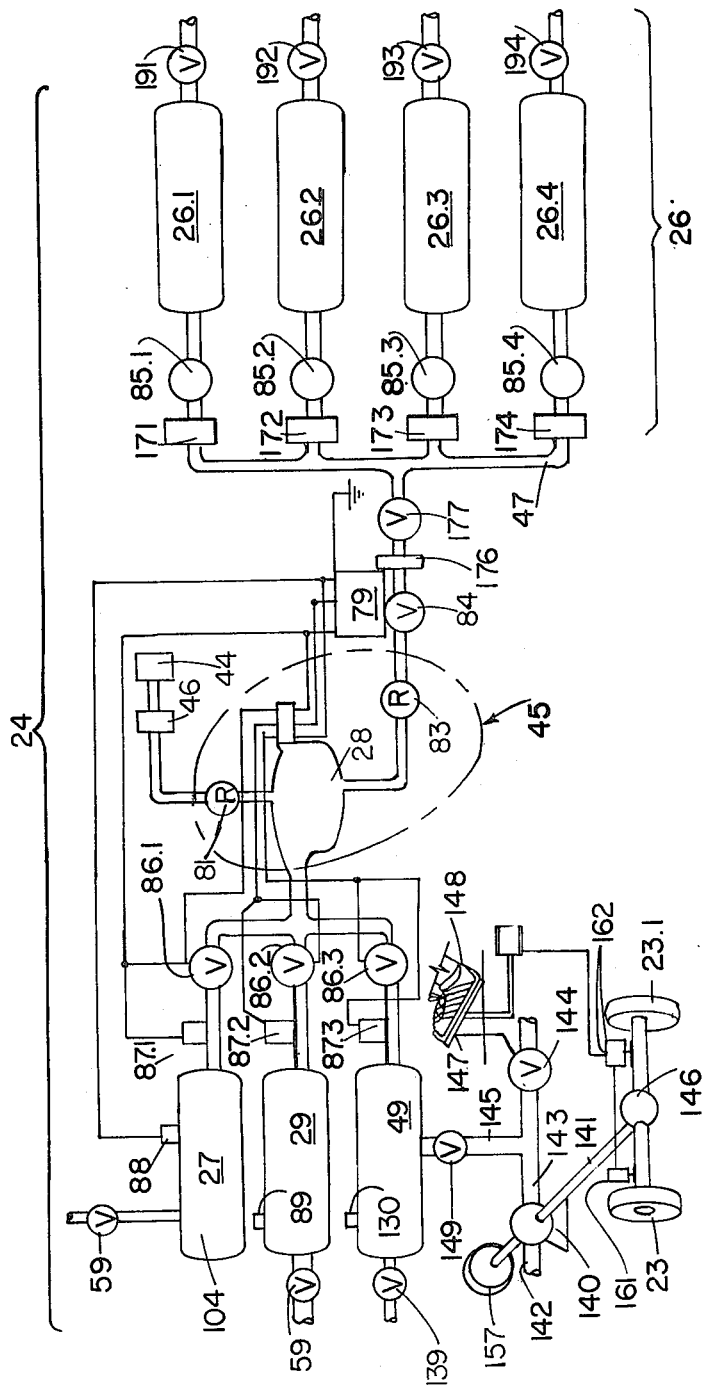
FIG. 15 is a diagrammatic showing of another set of connections of the tank assembly 24 and engines as in FIGS. 3-6 in a vehicle as shown in FIG. 1.

Each air injector, 43, is fed by an air injector manifold as 44 and the air injector manifold 44 is fed through a conduit assembly generally shown as 45 and comprising a tank as 28 and regulators as 81 and 83, in the tank system shown in FIG. 15. Alternatively, a tank and changeover valve system as shown in FIGS. 12-14 may be used to feed the manifold as 44 through like regulators as 83 and 831.

In the system of FIG. 15 and in the system of FIGS. 12-14 a conduit 47 connected to feed the valves as 46 and 84 is connected to a main tank assembly as 26. The same main tank assembly 26 is used in the system shown in FIGS. 12-14 and in the system shown in FIG. 15.

Each cylinder as 32 has an exhaust valve 41 at its top and an exhaust conduit 51 extends from the exhaust valve 41 to the inlet of a turbine 53. A lower cylinder conduit 52 also extends from openings as 39 near the lower portion of the walls as 35 of each cylinder as 32 to the inlet of turbine 53. The turbine 53 is operatively connected by an output belt or chain 54 to an air compressor 55 through a clutch 56. A compressor intake conduit 57 provides a feed conduit for air into the compressor 55 and a compressor outlet line 58 provides a conduit from compressor 55 to a recovery tank assembly 27. A crankshaft speed responsive clutch actuator connected to the crankshaft actuates clutches 56. A one-way valve 59 serves to maintain the pressure in the recovery tank assembly.

The air injector valve 43 comprises a casing 61, an inlet conduit connector 62, an outlet conduit 63, a spring 64, solenoid 65 and a core 66. The core 66 comprises a rigid frustoconical head 67 and a rigid shaft 68 firmly joined thereto; the shaft 68 fits into the solenoid 65 with a smooth sliding fit. The spring 64 normally holds the valve head in position that closes off the injector inlet conduit 62 from the outlet conduit 63 as shown in FIG. 7, while activation of the solenoid moves the head to a position as shown in FIG. 8 to provide for connecting the inlet and outlet conduits 195 and 63 of valve 43.

Camshaft 34, which is operatively yet movably connected to the crankshaft 33 by a timing gear and chain assembly 48 and so is sensitive to the position of the pistons as 36 in the cylinders as 35, provides actuation to each of the valves as 43 by closing a contact as 69 for each such valve and also actuates the exhaust valve 41 through a rocker arm 117.

A rechargeable electric battery 163, which is charged by an electric generator 164, which generator is actuated by the crankshaft 33, provides electrical power (via their contact points) for solenoids, as 65 and 79, of all electrically actuated valves, such as 85.1-85.4, 87.1-87.3, as well as for valve 84, and for the motor for the spool of changeover valve 90 and for the electrically activated valves as 85.1-85.4 and 86.1-86.3 (through the switches as on the tank pressure sensors as 87.1-87.3, 88, 89, 128, 129 and 130) and for the clutches 99 and 109.

The accelerator control valve 46 comprises a TEFLON ® valve body 71 of rectangular outline movably located in a rigid brass casing 72. Conduit line 45 enters the casing, line 45 exits from the valve casing. An adjustment screw 73 provides for locating the slide body 71 spaced away from the bottom of the casing 72 to allow a predetermined minimal opening 74 from conduit 47 to 63, hence provides for automatic idle adjustment of engine 25. A throttle cable 75 provides for adjustment of the slide and a return spring 76 holds the slide in predetermined position.

In high pressure main control valve 84, a semicylindrical valve body 77 is rotatably positioned in its valve casing 78, as shown in FIGS. 10 and 11, by a link arm 70 of a solenoid 79, to control flow through casing 78.

The valve body 77 has a straight upper edge 69 that, on downward (as shown in FIGS. 10 and 11) movement, exposes an increased cross-sectional area of the circular conduit, as 47 blocked by the remainder of such valve body below such edge. The amount of cross-sectional area of the circular conduit, as 47, blocked by such valve body varies in a non-linear and increasing manner with vertical movement of the edge 69, as is also the relation provided by the opening 74 in the valve 46.

The valve and tank assembly 24 shown in FIG. 15 comprises a plurality of tanks, as 26.1-26.4, 27, 28, 29 and 49, and control valves, as 81-87.3, therefore. The main tanks as 26.1, 26.2, 26.3 and 26.4 are high pressure gas-containing tanks and are connected by valves as 85.1, 85.2, 85.3, 85.4 respectively, to conduit 47 and to main tank outlet control valve 84. The outlet of valve 84 is connected to main tank pressure regulator 83; the outlet of that regulator 83 connects to a pressure control tank 28. An electrical pressuresensitive switch 82, which is firmly located in the wall of that tank 28 and senses the pressure of gas in that tank, is electrically connected to and activates the solenoid 79 of the tank valve 84 when and as needed as below described. In the operation of engine 25 and tank assembly of FIG. 15, the pressure in the main tanks as 26.1-26.4 start and drive the engine 25 in the vehicle 20. When the gas in any one of the recovery tanks as 27 reaches operating pressure of 450 p.s.i.g. the inlets to that recovery tank, as 27, shuts and that recovery tank's exhaust valve as 86.1 (or 86.2 or 86.3 for tanks 29 and 49) opens and the engine 25 is operated from the gas produced from such tanks as 27, (or 29 and/or 49 respectively).

In operation of vehicle 20 with assembly of FIG. 15 main tank valve 84 passes air at 4000 p.s.i.g. into the main tank pressure regulator 83. Regulator 83 pressurizes tank 28 to 350 p.s.i.g. and the engine 25 then operates from the main tanks as 26.1-26.4. When pressure in the recovery tank as 27, or 29, or 49 has reached 450 p.s.i.g. a high pressure sensitive valve in each such recovery tank, as 88 in tank 27 (a) opens the recovery tank valve as 8.61 for tank 27 (86.2 for tank 29 and 86.3 for tank 49) and (b) closes the main tank valve 84. Such action provides 450 p.s.i.g. to the pressure control tank 28. The final regulator 81 lowers the gas pressure to 150 p.s.i.g. for use in the engine cylinders as 32 via manifold as 44. The output from the pressure regulator 81 passes to an accelerator control valve as 46. As shown diagrammatically in FIG. 3 slide valve 46 is actuated by an operator as 148 adjustably pressing a footpedal to actuate a linkage 70 which linkage acts on the throttle cable 75 to control the opening 74 in the valve 46 and so control the volume of gas passing to the manifold 44 and thence to the engine cylinders as 32, 132 and 133.

The valve and tank assembly 24 may also comprise an intermediate exhaust gas storage tank as 181 which tank is connected to exhaust conduit 51 and to the inlet of turbine 153 and heat transfer coil 151. The inlet to the tank 181 is provided with a valve 30 which opens when the exhaust valve 41 opens or slightly before such event and closes when exhaust valve 41 closes or slightly before that event. The tank 181 provides for intermittent storage of intermediate pressure cylinder exhaust gas, which gas is then fed to turbine 153 over the period of time between the opening and the closing of the cylinder exhaust valve 41 in cylinder 32. Turbine 153 drives a compressor 50 to compress a small amount of air fed at inlet 131 of compressor 50. The discharge of compressor 50 has a higher temperature than the input to that compressor and such heated discharge is passed to heat transfer coil 151, which is in heat transfer contact with the cylinder 32. Such heated gas serves to heat the cylinder 32. The discharge of compressor 50 passes from the heat transfer coil 151 to storage in exhaust gas recovery tank as 29 at a pressure of 350-450 p.s.i.g.; a check valve 139 protects such input to the exhaust recovery storage tank 29. Alternatively, the turbine 53 may drive the engine crankshaft 33 by belt 40 and a one-way drive gearing which serve to transfer the energy of the gas theretofore in tank 181 to the crankshaft 33 when (a) the adjustable tee valve 154 is oriented to connect the discharge 155 of compressor 50 to exhaust, 156, as shown in FIG. 6 rather than to line 150 which leads to the coil 151 (in another position of valve 154) and (b) a clutch 158 connecting compressor 50 and turbine 153 is disengaged the crankshaft 33 is firmly connected to a flywheel 38.

The gas pressure in the cylinder provides the force that moves the piston 36 against the crankshaft as in FIG. 5; for such force to be maintained against the top of the piston at the bottom of the stroke of the piston some gas pressure remains in the cylinder at the bottom of the stroke, as at the position of the piston shown in FIG. 4. As the speed of rotation of the crankshaft 33 increases, less of the gas in the cylinder escapes through the ports as 39; such remaining gas is subsequently expelled through the exhaust valve so that when the piston rises again to its position in FIGS. 5 and 6, the gases exiting from exhaust valve 41 increase in pressure as the engine speed increases. Normally such exhaust gases exhausted from each cylinder as 32 might be wasted, but in the systems herein provided, at higher speeds of the engines as 25 and 125 the portions of the exhaust gases at such higher exhaust pressure are used to either (a) compress other gas portions to a useful range of pressure of (b) are used to drive the crankshaft whereby such portion of gas high pressure gases are utilized rather than wasted. Alternatively, as shown in FIG. 6, the temperature rise concomitant on such compression of the gases compressed is utilized (by heat exchange of the compressed gases with the cylinder walls as 35 in the cylinder chamber in which, as 32, such gases were initially expanded) to provide force against and do work on the moving piston as 36. While the expansion of the gas injected into the cylinder 32 is adiabatic the heat provided by such compresssion of gas by the exhaust from chamber 32 provides a greater work output per given weight of air injected into the cylinder 32, whereby the efficiency of the engine is increased.

The apparatus of FIG. 6 thus alternatively provides to use the heat energy of the exhaust gases or to use the mechanical energy of the exhaust gases from engine 25.

A brake compressor 140 is an air compressor attached to the frame of vehicle 20, and the rotor of compressor 140 is positively connected to and actuated by the drive shaft 141 of vehicle 20. Compressor 140 serves to compress air passed thereinto through the brake compressor inlet 142. The compressed outlet gas from brake compressor 140 is discharged through brake compressor outlet conduit 143. Conduit 143 is a short wide conduit and includes a spring loaded adjustable valve 144 at its discharge end. A rigid short branch 145 from the conduit 143 connects via check valve 149 to a brake gas storage tank 49. Drive shaft 141 is connected by a standard rear differential gear and housing 146 in standard manner to the rear wheels as 23 and 23.1 of the vehicle 20. As the shaft 142 turns the compressor 140 compresses inlet gas fed thereinto only when valve 144 is closed; the output of compressor 140 is collected in the tank 49. Actuation of brake pedal 147 of the vehicle 20 by operator 148 positions the movable blocking element of flapper of the large low-pressure adjustable valve 144. Movement of the flapper to its blocking position in valve 144 blocks the conduit 143, whereupon the compressor 140, of which the rotor is attached to the drive shaft 141, provides that the motion of the wheels 23 and 23.1 is resisted by the pressure in the tank 49 to which the conduit 145 is connected. Accordingly, the compressor 140 provides that the braking action on the shaft 142 and wheels 23 and 23.1 sends compressed gas into the chamber 49 while slowing down the moving vehicle 20. Further depression of the brake pedal 147 actuates the conventional brake shoes as 161 and 162 on wheels 23 and 23.1. In the system of FIG. 15, when the pressure in the recovery tanks as 27, 29 and 49 reaches a lower value, of about 350 p.s.i.g., pressure-sensing switches as 87.1, 87.2 and 87.3, respectively, connected to each those tanks send a signal to the pressure valves 85.1, 85.2 and 85.3 and shut such valves down and activate the solenoid 79 of the valve 84 so that the tanks 26.1, 26.2, 26.3 or 26.4 are then active. Stepping switches are used on each of the valves 85.1, 85.2, 85.3 and 85.4 so that it is not until the pressure in tank 26.1 falls below a predetermined value, such as at 1500 p.s.i.g., that valve 85.1 then closes, and valve 85.2 is actuated and that valve 85.2 stays open until the pressure in tank 26.2 falls to a predetermined value, (as below 1500 p.s.i.g.,) thereupon valve 85.2 is closed and valve 85.3 is actuated by a signal received from the switch in valve 85.2; when the pressure in tank 26.3 fallsto such predetermined value, the valve 85.3 is closed and valve 85.4 is opened and the next tank as 26.4 is connected to the valve 84 and regulator 83 to the tank 28 and, therethrough, to the engine 25.

The separate tanks 26.1-26.4 of main tank assembly 26 are firmly joined together in a frame and may be disconnected as a group at a coupling 176; such assembly as well as is also provided with a shut-off valve 177 to permit ready removal replacement of all the main tsnk assembly 26 comprising the tanks as 26.1-26.4 as shown diagrammatically in FIG. 15 (or 26.1-26.7 of assembly 26 as shown in FIG. 3). Each of the separate tanks as 26.1-26.4 have a separate coupling and shut-off valve assembly attached thereto, as 171-174 respectively, for removing such separate tank from the remainder of the bank or array of tank assembly 26 and is provided with a valve (as 191-194 respectively) to permit charging of lock of such tanks.

While separate tanks 26.1, 26.2, 26.3 and 26.4 are shown in FIG. 15 this array of tanks may be substituted for one compartmentalized tank, 26, with compartments connected as shown in FIG. 3. Also, each of the tank assemblies shown only as separate tanks 27, 29, and 49, may each be an assembly formed of a plurality of tanks, as 29.1 and 29.2 in FIG. 6. Generally, as many separate cylindrical main and recovery tanks may be used as space and weight permits, rather than requiring specialized compartmentalized tanks although, for purpose of clarity of presentation of the concepts and structures shown here, only a few of such separate tanks are shown.

In the engine assembly 120 shown in FIGS. 12-14, a main tank assembly 26 and a recovery tank assembly 27 are connected to an engine 125 through a changeover valve unit 90. Main tank assembly 26 comprises a plurality of separate cylindrical tanks as 26.1, 26.2, 26.3 and 26.4 (as in FIG. 15) or a compartmentalized cylindrical tank having a plurality of compartments as 26.1-26.7 (as in FIG. 3). The engine 125 comprises cylinders 132 and 133, fixedly attached to or formed in a rigid engine block casing 134, and a changeover valve and conduit assembly 90, also firmly affixed also to the casing 134. Engine 125 is structurally and functionally like engine 25 but has two cylinders, 132 and 133, each like cylinder 32 in engine 25, and with a crankshaft as 33 and other structures above described for engine 25.

In the system as shown in FIG. 13 the tank assembly 26 is connected through a pressure regulator (83) by a conduit 91 to a changeover valve 90. The changeover valve 90 is, in the stage and mode of operation shown in FIG. 13, arranged to pass air from the conduit 91 through a conduit 94 to the accelerator control valve 46 and thence to maniford 44. Air then passes from manifold 44 to left cylinder injector lines (95 like injector line 195 in FIG. 3) and a right cylinder injector line 105 (like 95). The air from conduit 95 passes to an engine left cylinder injector 96 (like injector 43) and thence into a left cylinder 132 (like cylinder 32) and therefrom to top and bottom left exhaust conduits 97 and 98 (like conduits 51 and 52 respectively) to a left turbine 99 (like 53). The left turbine 99 is operatively connected by a left clutch 100 to a left compressor 101. The output conduit 102 of the left compressor is connected to one arm of a tee 103. The air from right conduit 105 passes to a right injector 106 (like injector 43) and then into a right cylinder 133 (like cylinder 32) and therefrom to top and bottom right exhaust conduits 107 and 108 (like conduits 51 and 52 respectively) and to a turbine 109 (like 53). The turbine 109 is connected by a right clutch 110 to a compressor 111. A speed sensor driven by the crankshaft 34 actuates clutches 100 and 110 only when the crankshaft speed reaches a predetermined minimum value. The output 112 of the right compressor is connected to another arm of the tee 103. The base of tee 103 is connected to changeover valve 90 (which is shown in FIG. 14) and, in the mode shown in FIG. 13, directs the flow of compressed air from line 103 along the line 104 to the recovery tank assembly 27. Air enters compressors 101 and 111 via the air intake 124.

In an alternate method of operation of the system 120 the pressure sensing switches 129 and 128 operate on oppositely acting valve motor portions 123 and 153 of the valve 90 so that the core or spool 135 thereof is moved within the valve chamber 104 of the valve 90 so that air passing from recovery tank 27 passes through an output pressure regulator 122, line 121, the core 135 of valve 90 manifold 44, accelerator valve 46, lines 95 and 105 and then via injectors 96 and 106 through the cylinders 132 and 133 to drive the turbines 99 and 109. With clutches 100 and 110 connected turbines 99 and 109 drive compressors 101 and 111 and the output from those compressors passes from lines 102 and 112 via the spool of changeover valve 90 to the line 124, that line then acting as (a) an exhaust line or (b) as a conduit to charge the tanks of assembly 26 when the pressure in the tanks or compartments of that assembly is allowed to discharge to a very low pressure; such condition (b) exists when the vehicle as 20 carrying such tanks is operated at a sufficiently fast rate of speed that the exhaust gasses then generated by engine 20 have sufficient energy that recapture of some of such energy for further opertion of engines as 25 or 125 is desirable (and, by the apparatus of FIGS. 1-15 is accomplished). Engine 25 operates at 110 to 150 p.s.i.g. input at 43. The main tank assembly (26) pressure, although initially at 4,000 p.s.i.g., may drop down e.g. to 150 p.s.i.g. while the recovery tank assembly 27 may build up to 450 p.s.i.g. and then be used to charge the main tank assembly as 26 (if then below 300 p.s.i.g.). The electric clutches 100 and 110 are controlled automatically by speed sensitive switches, which keep the compressors 99 and 109 from operating at idle and low speeds. The pressure switches 129 and 128 control the changeover valve 90 as above described through an electric comparator trigger 127 acting on motors 123 and 153.

The crankshaft 33 of the engine 25 or 125 is releasably connected to the drive shaft 141 of vehicle 20 through an engine clutch 157 and the drive shaft is connected to drive wheels 23 and 23.1 of the vehicle 20. Clutch 157 is controlled by the operator 148 in the passenger compartment 21 of the vehicle 20. When the operator disengages the clutch of the moving vehicle 20, the exhaust energy of the engine 25 is automatically recaptured in recovery tank 27 and/or 49 as above described. Recovery in tank 49 of the braking energy developed from the momentum of the car is concurrently effected when the operator applies brakes to the wheels of the vehicle as above described.

In a particular embodiment of vehicle 20 with an engine as 125 having 6 cylinders as 32 (or 132 and 133) each with a piston stroke of 3 inches (76 cm) and a 3 inch (76 cm) diameter and compression ratio of 8 and tanks as 26.1-26.7 of ½ inch (1.2 cm) steel walls to withstand 4,000 p.s.i.g. (281 kg./sq. cm ) pressure with 12 to 15 inch (30 to 38 cm ) diameter in a trunk space of 40 cubic feet (1.13 cubic meters) as is provided in a Mercedes Benz 230 type vehicle (1966 model), with the engine hood space occupied by engine 125 and tanks as 27, 29 and 49. With initial 120 p.s.i.g. cylinder pressure system 120 provides travel of 1 hour at 40 miles (64.4 km) per hour with a factor of safety of about 28% when honeycombed compartmentalized tanks are used instead of cylindrical tanks. At U.S. $1.50 per 3,500 cubic feet (99,120 liters ) of gas, this is also more economical than use of gasoline fuel at $1.20 per gallon (3.785 liters) at 25 miles (40 km) per gallon (3.785 liters) mileage on an internal combustion engine powered vehicle of the same weight (4,000 lbs) (1,814 kgm) without the recovery systems utilizing tank assemblies 27 and 29 and 49; with such recovery systems the overall efficiency and output of the system 120 and vehicle as 20 is further improved, especially on stop and go driving.

The length of travel of the vehicle 20 during stop and go driving is especially helped by the recovery system of system 120 utilizing the braking energy (by recovery tank 49 and related valves) and utilizing the recovery of energy provided at higher engine speeds by tanks 27 and 29.

A primary exhaust control valve 80 is an adjustable low pressure valve, normally closed during the power stroke of pistons, as 36, of engines 25 and 125 (downwardly as shown in FIG. 4) and opens fully only after a certain predetermined minimum exhaust pressure is developed during the exhaust stroke of the pistons, as 36, as at position of piston 36 shown in FIG. 5, although closed for the immediately prior engine cycle period as shown in FIG. 6. Valve 80 helps develop an adjustable back pressure during and the upward (as shown in FIGS. 4-6) stroke of the piston 36 following the expansion position of piston 36 shown in FIG. 4 to its upper position shown in FIG. 6. Valve 80 comprises a resilient spring 187 supported at bracket 188 on an adjustable threaded support 189 and acts on a pivoted flapper 190 that releasably blocks exhaust conduit 51. Constant discharge pressure regulator 831 on line 121 is like 83 on line 91.

Industrial Applicability

Vehicles such as 20, according to this invention, may be used as a short route truck or as a bus with repeated replacement of used main tank assemblies as 26 with fresh or fully charged tank assemblies, such replacement occurring at terminals from which such buses or trucks are dispatched to their routes with all of the component tanks of such assembly firmly held as a unit in a rigid pallet for more convenient handling as a unit. The used tanks are refilled at such terminals while the truck or buses travel along their route with fresh or fully charged tank assemblies. Additionally, the engine system may be used as a conversion kit for internal combustion engines with the standard internal combustion engine replaced by the engine of this disclosure and tanks as 26.1-26.7 recharged during periods of non-use of such vehicles.

I claim:

1. A vehicle comprising a rigid frame firmly attached to and supporting a passenger compartment drive wheels attached to said frame, an air tank assembly and an engine supported on said frame, said tank assembly comprising a high pressure main tank sub-assembly and a recovery tank sub-assembly, said tank assembly and engine forming an engine system, said engine comprising a rigid casing, a crankshaft and a camshaft in engine casing bearings therefor on said casing, said casing having formed therein a plurality of like cylindrical chambers, a piston movable in each of said cylindrical chambers which piston forms a smooth slidable fit with a wall of each such chambers, each piston rotatably attached to the crankshaft by a linkage, said camshaft actuating a valve timing mechanism, each cylinder having an exhaust valve, a first engine exhaust conduit extending from said exhaust valve to the inlet of a turbine and a second conduit extending from openings near the lower portion of the wall of each cylinder to the inlet of the turbine, said turbine operatively connected to an air compressor through a first air compressor clutch, a compressor intake conduit providing a feed conduit for air into said compressor and a compressor outlet conduit from said compressor to a first recovery tank, said main tank sub-assembly comprising a plurality of main high-pressure tanks each of which is connected to a main tank conduit, said main tank conduit connected to a main tank control valve, said main tank control valve connected to a main tank pressure regulator, said main tank outlet pressure regulator connected to a pressure control tank, a pressure sensitive switch in said pressure control tank and connected to said main tank outlet control valve, on outlet of said pressure control tank connected to a manifold inlet line, said manifold inlet line connected to a manifold, an accelerator control valve connected to said manifold inlet line, said manifold connected to said engine cylindrical chambers, an outlet valve connected to said first recovery tank, a recovery tank outlet conduit operatively connected to said recovery tank outlet valve, a pressure sensor with an input connected to the interior of said recovery tank, an output of said pressure sensor connected to said main control valve and to said outlet valve of said recovery tank, said outlet conduit of said recovery tank connected to said pressure control tank.

2. Apparatus as in claim 1 comprising also a valve adjustably and releasably blocking said first engine exhaust conduit.

3. Apparatus as in claim 1 also comprising a second compressor operatively connected to said drive shaft, a brake compressor outlet conduit on said second compressor, a releasable clutch between said engine crankshaft and said driveshaft, a brake recovery tank connected to said brake compressor outlet conduit, a brake recovery tank outlet conduit operatively attached to said brake recovery tank, a brake recovery tank outlet control valve on said brake recovery tank outlet conduit, brakes connected to said wheels of said vehicle, a brake pedal operatively connected to said brakes, said brake pedal serving to operatively connect said second compressor and said brake recovery tank, a pressure sensor having an input operatively connected to the interior of said brake recovery tank and an output connected to said main control valve and to said brake recovery tank outlet control valve, said outlet control conduit of said brake recovery tank operatively connected to said pressure control tank.

4. Apparatus as in claim 1 comprising also an intermediate storage tank connected to said engine exhaust conduit and to said turbine, and comprising a conduit from said compressor outlet conduit to a heat exchanger operatively connected to a cylindrical chamber of said engine.

5. Apparatus as in claim 1 wherein said turbine connects to said crankshaft and drives said crankshaft.

6. A vehicle comprising a rigid frame firmly attached to and supporting a passenger compartment drive wheels attached to said frame, an air tank and an engine supported on said frame, said tank assembly comprising a high pressure main tank sub-assembly and a recovery tank, said tank assembly and engine forming an engine system, said engine comprising a rigid casing, a crankshaft and a camshaft in engine casing bearings therefor on said casing, said casing having formed therein a plurality of like cylindrical chambers, a piston movable in each of said cylindrical chambers which piston forms a smooth slidable fit with a wall of each such chambers, each piston rotatably attached to the crankshaft by a linkage, said camshaft actuating a valve timing mechanism, each cylinder having an exhaust valve, a first engine exhaust conduit extending from said exhaust valve to the inlet of a turbine and a second conduit extending from openings near the lower portion of the wall of each cylinder to the inlet of the turbine, said turbine operatively connected to an air compressor through a first air compressor clutch, a compressor intake conduit providing a feed conduit for air into said compressor and a compressor outlet conduit from said compressor to a recovery tank, said high pressure main tank assembly comprising a plurality of main high pressure tanks each of which tanks is connected to a main tank conduit, and said main tank assembly and said recovery tank are connected to a changeover valve, said changeover valve comprising a valve body, a spool, and a motor attached to said spool, said spool slidably attached to said body, a pressure sensor comprising an input which input is connected to the main tank assembly and having an output which output is connected to a changeover valve motor to move the spool in a first direction and another pressure sensor having an input which input is connected to said recovery tank and an output which output is connected to a changeover valve motor to move said spool in a direction opposite to said first direction, said changeover valve is operatively connected to a manifold inlet line, said manifold inlet line connected to a manifold, an accelerator control valve connected to said manifold inlet line, said manifold connected to said cylindrical chambers in said engine.

7. Apparatus as in claim 6 wherein said actuator responsive to said crankshaft speed actuates said first air compressor clutch.

8. Apparatus as in claim 6 also comprising a second compressor operatively connected to said drive shaft, a brake compressor outlet conduit on said second compressor, a releasable clutch between said engine crankshaft and said driveshaft, a brake recovery tank connected to said brake compressor outlet conduit, a brake recovery tank outlet conduit operatively attached to said brake recovery tank, a brake recovery tank outlet control valve on said brake recovery tank outlet conduit, brakes connected to said wheels of said vehicle, a brake pedal operatively connected to said brakes, said brake pedal serving to operatively connect said second compressor and said brake recovery tank, a pressure sensor having an input operatively connected to the interior of said brake recovery tank and an output connected to said main control valve and to said brake recovery tank outlet control valve, said outlet control conduit of said brake recovery tank operatively connected to said pressure control tank.

9. Process of driving a vehicle by the steps of
(a) passing high pressure air from a first chamber at high pressure past a regulator valve to a second chamber at a lower pressure and passing air from said second chamber to a movable engine element in an engine casing therefor in an engine and driving said engine element therewith and driving ground engaging wheels of said vehicle by said engine, and concurrently
(b) passing exhaust air from said engine casing to a turbine, sensing the speed of motion of said engine element and connecting a compressor to said turbine in response to said sensing of speed of motion of said engine element, compressing air by said compressor and passing said compressed air to storage in a third chamber,
(c) sensing the pressure of said compressed air in said third chamber and in said second chamber and, responsive to the pressure in said third chamber exceeding the pressure in said second chamber, passing air from said third chamber to said second chamber and stopping passage of air from said first chamber to said second chamber.

10. Process as in claim 9 wherein said vehicle has momentum, the step of driving a compressor on said vehicle by movement of said ground engaging wheels, collecting said compressed air in a chamber in said vehicle and passing said compressed air to said second chamber.

11. Process as in claim 9 wherein said compressed air is passed in heat exchange with said engine.

12. Process as in claim 10 wherein the air pressure in said first chamber is initially 3,000 to 4,000 p.s.i.g., the air pressure in said second chamber is 350 to 450 p.s.i.g., and said engine element is driven by gas pressure of 110 to 150 p.s.i.g.

* * * * *